April 19, 1960   F. K. H. NALLINGER   2,933,072
FUEL INJECTION COMBUSTION ENGINE
Filed March 25, 1957   2 Sheets-Sheet 1
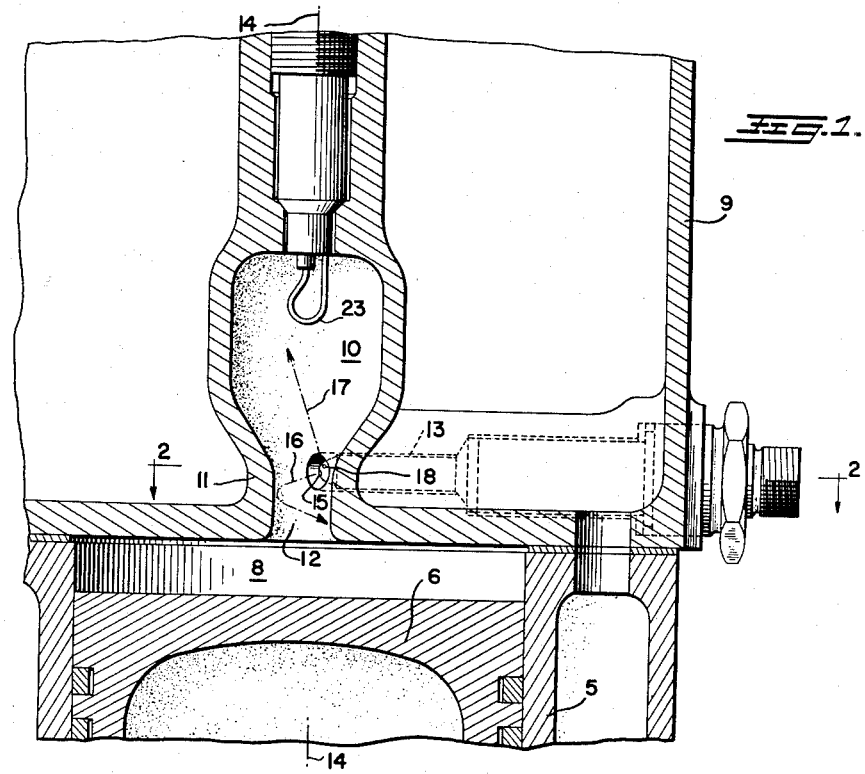
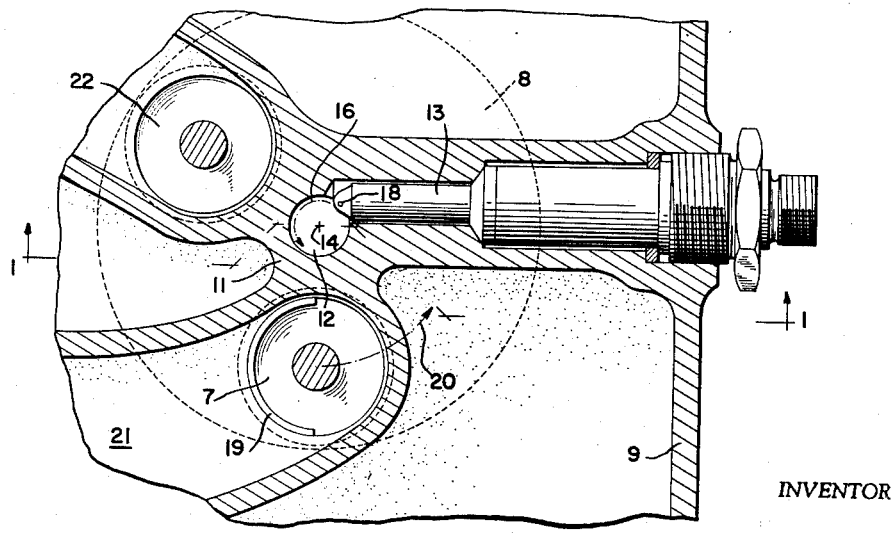
INVENTOR
FRIEDRICH K. H. NALLINGER
BY Dicke and Craig
ATTORNEYS

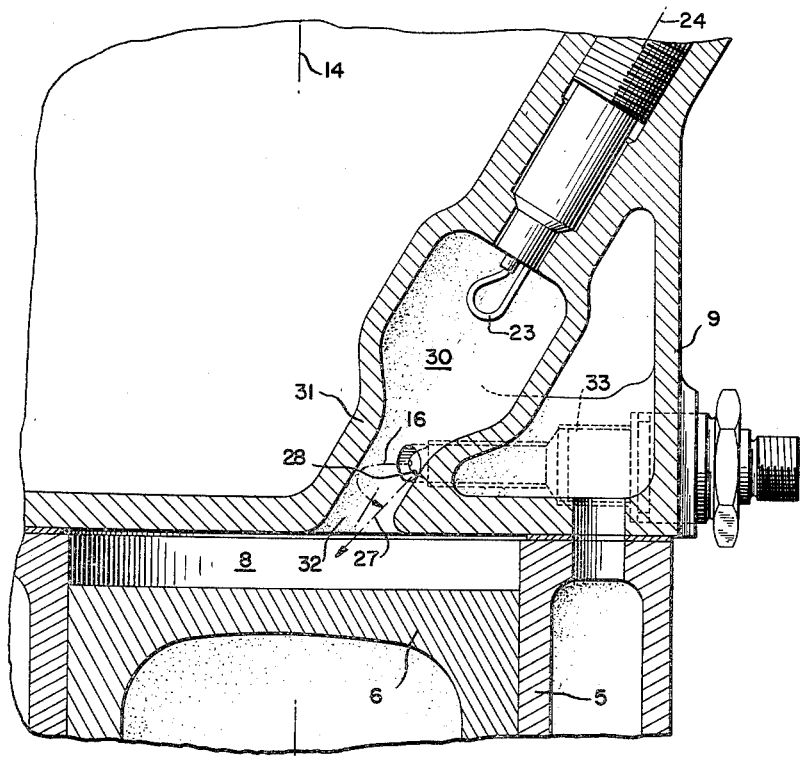

United States Patent Office 2,933,072
Patented Apr. 19, 1960

---

2,933,072

FUEL INJECTION COMBUSTION ENGINE

Friedrich K. H. Nallinger, Stuttgart, Germany, assignor to Daimler-Benz Aktiengesellschaft, Stuttgart-Unterturkheim, Germany Application March 25, 1957, Serial No. 648,196

Claims priority, application Germany March 28, 1956

14 Claims. (Cl. 123—32)

The present invention relates to an air-compressing fuel-injection internal combustion engine or diesel engine, and more particularly to such a type of engine which is provided with a chamber separated from the working cylinder properly speaking, and in which the fuel is applied toward the end of the compression stroke of the working piston against the walls of the chamber as a thin film, is evaporated thereat, then mixed and combined with the combustion air and thereupon burned.

The internal combustion engine according to the present invention distinguishes itself from engines of known prior constructions in that the chamber which is arranged in the cylinder head in a manner known per se and which is effective in the manner of a prechamber is in communication with the working cylinder of the engine by means of an overflow channel which is relatively wide as compared to the diameter of the chamber, and in that the fuel is injected transversely to the longitudinal axis of the overflow channel essentially tangentially onto the walls thereof. The portion of the combustion air displaced into the chamber during the end of the compression stroke and the burning pre-mixture which flows back after initiation of the combustion in the chamber from the latter into the cylinder space, each separate during the passage thereof through the overflow channel the fuel vapor from the walls of the overflow channel and are continuously mixed therewith whereby an even combustion, a relatively noiseless operation of the engine and a high insensitivity thereof against changes in the type of fuel used in the engine are obtained.

As compared to engines operating in a similar manner which are provided with a combustion chamber arranged in the working piston thereof and almost completely open toward the cylinder space, the arrangement and configuration of the chamber in accordance with the present invention offers the advantage that the speed of evaporation of the fuel along the walls of the chamber throat may be regulated very finely and accurately and that the evaporation process may thereby be accurately adapted to the particular type of fuel used at that time in that the supply of the cooling medium used for cooling the cylinder head may be correspondingly regulated toward the outside of the chamber throat.

Furthermore, the orifice of the injection nozzle in the engine according to the present invention always has the same distance from the place where the fuel impinges on the internal surface of the chamber throat whereas this distance in the known prior art engines with combustion chambers arranged in the piston changes as a result of the to-and-fro movement of the piston.

According to a further feature of the present invention, the controlled separation of the fuel vapors from the inner surface of the chamber throat may be further enhanced in that a rotary movement about the longitudinal axis of the cylinder is imparted to the combustion air flowing into the working cylinder during the inflow thereof, for example, by means of skirted inlet valves or the like, so that the air eddies or turbulence produced thereby continues during the overflow of the air into the chamber with increased intensity.

Furthermore, the fuel injection nozzle may also be constructed in a manner known per se so that it produces a second jet of fuel serving as ignition jet which is then directed either into the working cylinder or into the interior of the chamber, in the latter case preferably against an electric glow plug arranged at the closed end of the chamber. This facilitates starting of the engine also at relatively colder temperatures.

Accordingly, it is an object of the present invention to provide an arrangement and construction of the various parts of an air-compressing fuel-injection engine which is characterized by a relatively even and smooth combustion process, a relatively noiseless operation of the engine and a great insensitivity of the engine to the particular type of fuel used in the engine.

It is another object of the present invention to provide an air-compressing fuel-injection engine which has greater versatility and adaptability in its operation, particularly as regards its insensitivity to the type of fuel injected.

Still another object of the present invention resides in the provision of an internal combustion engine of the air-compressing, fuel-injection type which enables a very fine control of the evaporation processes of the fuel along the walls of an overflow passage.

Another object of the present invention is the provision and arrangement of an air-compressing, fuel-injection type internal combustion engine in which the evaporation of the fuel may be accurately adapted to the type of fuel used by controlling the supply of the cooling medium which cools the throat portion forming the overflow passage.

A further object of the present invention resides in the provision of an air-compressing, fuel-injecting combustion engine in which the same distance is maintained throughout the operation from the orifice of the injection nozzle to the point where the fuel impinges on the walls against which it is injected.

Still another object of the present invention resides in the construction and arrangement of the various parts of a diesel internal combustion engine which facilitates starting thereof even during cold temperatures.

These and other objects, features and advantages of the present invention will become more obvious from the following description when taken in connection with the accompanying drawing which shows, for purposes of illustration only, two embodiments in accordance with the present invention and wherein:

Figure 1 is a longitudinal cross-sectional view through the upper part of the working cylinder and cylinder head of an internal combustion engine in accordance with the present invention;

Figure 2 is a cross-sectional view through the cylinder head taken along line 2—2 of Fig. 1; and Figure 3 is a longitudinal cross-sectional view similar to Figure 1 of a slightly different embodiment of an internal combustion engine in accordance with the present invention.

The present invention consists essentially in the provision of a chamber in the cylinder head which is separated from the working cylinder, properly speaking, by an overflow passage or channel which is relatively wide, yet provides the necessary throttling effect, in which the piston head is essentially flat, and in which injection of the fuel takes place at a point in the overflow passage essentially tangentially to the walls thereof so as to produce a helical flow of the injected fuel along the walls of the overflow passage. Furthermore, the inflowing air is so guided as to have a predetermined rotary movement while, if so desired, the temperature of the throat portion forming the overflow channel may be controlled by adjusting the supply of that portion of the cooling medium for the engine that flows past the overflow channel in cooling relationship therewith.

Referring now to the drawing wherein like reference numerals are used throughout the various views to designate like parts, and more particularly to Figures 1 and 2 thereof, reference numeral 5 designates the working cylinder in which the working piston 6 reciprocates in the usual manner. During the downward or expansion stroke of the piston 6, air is sucked into the working cylinder 5 through the inlet valve 7 which at that time is opened. During the outward or compression stroke of the working piston 6, the combustion air thus drawn into the working cylinder 5 is thereupon compressed in the cylinder space 8 after the valve 7 is again closed. As a result thereof, the piston 6 displaces toward the end of the compression stroke thereof a large part of the air into the chamber 10 arranged in the cylinder head 9.

Liquid fuel is injected into the overflow channel 12 formed by the chamber throat 11 toward the end of the compression stroke through the nozzle 13. The nozzle 13 is arranged perpendicularly to the longitudinal axis 14 of the chamber 10, as may be seen in Figure 1, and is displaced laterally thereto, as viewed in plan view of Figure 2, in such a manner that the main jet 16 of the fuel which is discharged from the slightly downwardly directed aperture or orifice 15 of the nozzle head, impinges tangentially against the walls of the chamber throat 11 and forms thereon a thin film having a helically shaped movement in its continued flow along the overflow channel walls.

This film is separated at least in part from the wall of the chamber throat 11 by the highly compressed and correspondingly hot air which is forced into the chamber 10 through the overflow channel 12, and simultaneously therewith, is taken along by the highly compressed hot combustion air into the chamber 10 after separation thereof from the wall portions 11. The separation of the fuel film takes place during the normal operation of the engine, i.e., when the chamber throat 11 has a relatively higher temperature, in vapor form so that a mixture of fuel vapor and air which is instantaneously combustible, flows into the chamber 10. The relatively rich mixture is thereat ignited in the normal operation by an auxiliary fuel jet 17 which is discharged from a second upwardly inclined bore 18 of the nozzle 13 into the center of the chamber 10 and is ignited therein almost instantaneously by reason of the highly heated air which is in the chamber 10.

The chamber 10 thereby is effective in a manner similar to a prechamber in that the rich mixture is subjected therein to partial combustion and further preparation and, as a result of the increase in pressure produced therein, is thrown with a large force through the overflow channel 12 in a burning state into the cylinder space 8, properly speaking, so as to completely burn with the remainder of the compressed combustion air which is found in the cylinder space 8. During its passage through the channel 12 the burning mixture separates the remaining part of the fuel film which may have remained thereat also in vapor form from the walls of the chamber throat 11 and also carries it along for complete combustion into the cylinder space 8.

The mixing and combustion process described hereinabove is further enhanced in the illustrated embodiment in that the inlet valve is provided with a so-called "skirting" 19 of known construction by means of which a rotary movement about the longitudinal axis of the cylinder is imparted to the air flowing into the cylinder space 8 during the suction stroke of the piston 6. This rotary movement of the air continues during the compression stroke of the piston 6 with an increased degree in the overflow channel 12 and in the chamber 10 due to the ratio of the respective diameters thereof. The skirting 19 is preferably so arranged that it imparts a rotary movement to the air in the direction of the arrow 20, i.e., in the same direction as the rotary or circular movement of the fuel film along the inner walls of the chamber throat 11 indicated by arrow 16. Instead of the skirting 19, any other known means for producing the rotation of the air in the cylinder space may be used.

The combustion gases which expand in the cylinder space 8 during the working stroke of the piston 6 are thereupon expelled therefrom during the following compression stroke through the outlet valve 22 which is opened at that time, into the atmosphere.

The cross section and the length of the overflow channel 12 are so dimensioned in relation to the volume of the chamber 10 that the channel during the overflow or passage of the air or of the burning mixture from the cylinder space 8 into the chamber 10 and vice versa exerts a sufficient throttling effect on the gases to provide the effect of the chamber 10 as precombustion chamber; however, the cross section of the overflow channel may be selected considerably larger than in the usual precombustion chamber engines, by reason of the improvement of the mixture formation and the combustion processes by the measures described hereinabove. Consequently, the savings in pumping work for the precombustion chamber effect achieved with respect to the prior art engine types produces an increase of the engine output with simultaneous relatively smaller fuel consumption.

In order to bring about the evaporation of the fuel along the walls of the chamber throat 11 in the relatively short time interval necessary, yet, on the other hand, in order to prevent cracking of the fuel and the formation of carbon residues which may adhere to the overflow channel walls, the temperature of the chamber throat 11 must be maintained during operation at a predetermined value.

During the starting of the engine, the air compressed in the cylinder space and the wall of the chamber throat 11 have still a relatively low temperature. As a result thereof, during the starting, the fuel film injected against the wall of the chamber throat 11 is taken along into the chamber 10, not as vapor but still in liquid form. In order to assure also in these cases a safe ignition of the mixture in the chamber 10, an electric glow plug 23 of known construction is arranged at the closed end of the chamber 10 which may be energized during starting of the engine. The ignition effect of this glow plug 23 is further aided in that the auxiliary fuel jet 17 of the injection nozzle 13 is directed toward the glow plug 23.

The modified embodiment of the engine in accordance with the present invention as illustrated in Figure 3 which has in principle the same operation, distinguishes itself from the embodiment described hereinabove only by the fact that the longitudinal axis 24 of the chamber 30 does not coincide with the longitudinal axis 14 of the working cylinder 5 but instead is displaced laterally with respect thereto and arranged at an incline relative thereto. As a result of this arrangement, more favorable constructional conditions for the valves and the injection nozzle are created as well as a better possibility to control the cooling of the chamber 30 and especially of the chamber throat 31 independently of the cooling arrangement of the remaining parts of the cylinder head. Moreover, in the engine illustrated in Figure 3 the injected auxiliary jet 27 which is discharged from a second bore 28 of the injection nozzle 33 is directed as ignition jet through the overflow channel 32 into the cylinder space 8.

While I have shown only two preferred embodiments of the present invention, it is understood that the same is susceptible of many changes and modifications within the spirit of the present invention and I intend to cover all such changes and modifications as encompassed by the appended claims.

I claim:

1. A prechamber compression ignition internal combustion engine provided with a working cylinder and a cylinder head, comprising means forming a precombustion chamber in said cylinder head, a main combustion chamber formed by said cylinder, means forming an overflow channel connecting said precombustion chamber with said main combustion chamber, said overflow channel being relatively wide in comparison to the diameter of said precombustion chamber, and means for injecting fuel into said overflow channel essentially tangentially against the walls thereof.

2. A prechamber compression ignition internal combustion engine the combination according to claim 1, wherein said injecting means injects said fuel essentially tangentially against said walls with a component in the axial direction of said overflow channel so as to produce a spiral flow of said fuel along said walls.

3. A prechamber compression ignition internal combustion engine, the combination according to claim 1, further comprising means for imparting rotary movement to the air drawn into said working cylinder.

4. A prechamber compression ignition internal combustion engine the combination according to claim 3, wherein the rotary movement of said air is in the same direction as the spiral movement of said fuel.

5. A prechamber compression ignition internal combustion engine provided with a working cylinder and a cylinder head, comprising means forming a precombustion chamber in said cylinder head, a main combustion chamber formed by said cylinder, means forming an overflow channel connecting said precombustion chamber with said main combustion chamber, said overflow channel being relatively wide in comparison to the diameter of said precombustion chamber, and means for injecting fuel into said overflow channel essentially tangentially against the walls thereof, said injecting means injecting a second jet essentially in the direction of said overflow channel.

6. In an air-compressing fuel-injection internal combustion engine having a working cylinder with a cylinder axis and a cylinder head provided with a precombustion chamber in said cylinder head, comprising means forming an overflow channel having an axis and connecting said chamber with said working cylinder, said overflow channel being relatively wide in comparison to the diameter of said chamber but offering sufficient throttling to enable functioning thereof in the manner of a precombustion chamber, and means for injecting the fuel into said overflow channel essentially tangentially against the walls thereof and at an angle to the axis of said overflow channel with a slight axial component so as to produce an essentially helical movement of said fuel along said walls.

7. In an air-compressing fuel-injection internal combustion engine the combination according to claim 6, wherein said cylinder axis coincides with said overflow channel axis.

8. In an air-compressing fuel-injection internal combustion engine having a working cylinder with a cylinder axis and a cylinder head provided with a precombustion chamber in said cylinder head, comprising means forming an overflow channel having an axis and connecting said chamber with said working cylinder, said overflow channel being relatively wide in comparison to the diameter of said chamber but offering sufficient throttling to enable functioning thereof in the manner of a precombustion chamber, the axis of said overflow channel being displaced and inclined with respect to said cylinder axis, means for injecting the fuel into said overflow channel essentially tangentially against the walls thereof and at an angle to the axis of the overflow channel with a slight axial component in the direction of said overflow channel so as to produce an essentially helical movement of said fuel along said walls.

9. In an air-compressing fuel-injection internal combustion engine the combination according to claim 6 further comprising a glow plug disposed at the closed end of said chamber.

10. In an air-compressing fuel-injection internal combustion engine having a working cylinder with a cylinder axis and a cylinder head provided with a precombustion chamber in said cylinder head, comprising means forming an overflow channel having an axis and connecting said chamber with said working cylinder, said overflow channel being relatively wide in comparison to the diameter of said chamber but offering sufficient throttling to enable functioning thereof in the manner of a precombustion chamber, and means for injecting the fuel into said overflow channel essentially tangentially against the walls thereof and at an angle to the axis of said overflow channel with a slight axial component so as to produce an essentially helical movement of said fuel along said walls, further comprising a glow plug disposed at the closed end of said chamber, said injection means discharging a second jet of fuel directed against said glow plug.

11. In an air-compressing fuel-injection internal combustion engine having a working cylinder with a cylinder axis and a cylinder head provided with a precombustion chamber in said cylinder head, comprising means forming an overflow channel having an axis and connecting said chamber with said working cylinder, said overflow channel being relatively wide in comparison to the diameter of said chamber but offering sufficient throttling to enable functioning thereof in the manner of a precombustion chamber, and means for injecting the fuel into said overflow channel essentially tangentially against the walls thereof and at an agle to the axis of said overflow channel with a slight axial component so as to produce an essentially helical movement of said fuel along said walls, said fuel injection means injecting a second jet of fuel serving as ignition jet through said overflow channel into said working cylinder.

12. In an air-compressing fuel-injection internal combustion engine having a working cylinder with a cylinder axis and a cylinder head provided with a precombustion chamber in said cylinder head, comprising means forming an overflow channel having an axis and connecting said chamber with said working cylinder, said overflow channel being relatively wide in comparison to the diameter of said chamber but offering sufficient throttling to enable functioning thereof in the manner of a precombustion chamber, and means for injecting the fuel into said overflow channel essentially tangentially against the walls thereof and at an angle to the axis of said overflow channel with a slight axial component so as to produce an essentially helical movement of said fuel along said walls, said fuel injecting means injecting a second jet of fuel serving as ignition jet into the interior space of said chamber.

13. In an air-compressing fuel-injection internal combustion engine the combination according to claim 6 further comprising means for imparting the rotary movement to the air drawn into said working cylinder about said cylinder axis, the direction of rotation of the combustion air being in the same sense as the helical movement of said fuel in said overflow channel.

14. A pre-chamber compression ignition internal combustion engine provided with a working cylinder and a cylinder head, comprising means forming a precombustion chamber in said cylinder head, a main combustion chamber formed in said cylinder, means forming an overflow channel of essentially constant flow area connecting said precombustion chamber with said main combustion chamber, said overflow channel being relatively wide in comparison to the diameter of said precombustion chamber, and means for injecting fuel into said overflow channel essentially tangentially against the walls thereof.

(References on following page)

References Cited in the file of this patent

UNITED STATES PATENTS 2,436,855 Culbert _____ Mar. 2, 1948

FOREIGN PATENTS 782,046 France _____ Mar. 11, 1935
1,069,895 France _____ Feb. 17, 1954
201,569 Australia _____ May 24, 1956
767,288 Great Britain _____ Jan. 30, 1957

OTHER REFERENCES

Mechanical Engineer's Handbook by Lionel S. Marks, 4th edition, 1941, published by McGraw-Hill Book Company, New York, N.Y.

High Speed Diesel Engines by P. M. Heldt, 6th edition, 1950, published by P. M. Heldt, Nyack, New York.